United States Patent
Martret et al.

(10) Patent No.: US 8,301,957 B2
(45) Date of Patent: Oct. 30, 2012

(54) INCREMENTAL REDUNDANCY RETRANSMISSION METHOD FOR FRAGMENTED PACKETS

(75) Inventors: Christophe Le Martret, Levallois Perret (FR); Aude Le Duc, Paris (FR)

(73) Assignee: THALES, Neuilly sur Seine (FR)

( * ) Notice: Subject to any disclaimer, the term of this patent is extended or adjusted under 35 U.S.C. 154(b) by 709 days.

(21) Appl. No.: 12/520,829

(22) PCT Filed: Dec. 20, 2007

(86) PCT No.: PCT/EP2007/064392
§ 371 (c)(1),
(2), (4) Date: Sep. 21, 2009

(87) PCT Pub. No.: WO2008/077909
PCT Pub. Date: Jul. 3, 2008

(65) Prior Publication Data
US 2010/0050038 A1 Feb. 25, 2010

(30) Foreign Application Priority Data
Dec. 22, 2006 (FR) .................................. 06 11256

(51) Int. Cl.
G08C 25/02 (2006.01)
H04L 1/18 (2006.01)
H03M 13/00 (2006.01)

(52) U.S. Cl. ........................ 714/751; 714/748
(58) Field of Classification Search .................. 714/748, 714/751
See application file for complete search history.

(56) References Cited

U.S. PATENT DOCUMENTS

| | | | |
|---|---|---|---|
| 6,519,223 B1 * | 2/2003 | Wager et al. | 370/216 |
| 7,680,118 B2 * | 3/2010 | Zegers et al. | 370/394 |
| 8,121,063 B2 * | 2/2012 | Jiang | 370/310 |
| 2006/0150050 A1 * | 7/2006 | Choi et al. | 714/748 |

FOREIGN PATENT DOCUMENTS

| | | |
|---|---|---|
| EP | 1677449 A | 7/2006 |
| WO | 00/60799 A | 10/2000 |
| WO | 02/058314 A | 7/2002 |

OTHER PUBLICATIONS

Jeon, et al: "Packet Scheduler for Mobile Internet Services Using High Speed Downlink Packet Access" IEEE Transactions on Wireless Communications, IEEE Service Center Piscataway, NJ, US vol. 3, No. 5, Sep. 2004., p. 1789-1801.

Choi, et al: "MSDU-Based ARQ scheme for IP-level performace maximization" Global Telecommunications Conference 2005. Global Telecommunications Conference 2005. Globecom' 05 IEEE St. Louis, Mo, USA, Nov. 28-Dec. 2 2005, Piscataway, NJ USA, IEEE, Nov. 28, 2005, pp. 2495-2499.

Damnjanovic; et al, "Forward high-speed wireless packet data serive in is-2000—1xev-dv" IEEE Communication Magazine, IEEE Service Center, Piscataway, US Vol. 41. No. 8, Aug. 1, 2003.

LG Electronics: "Forward packet Data Control Assignment Channel" 3rd Generaltion Partnership Project 2 3 GPP2, Jul. 31, 2006, pp. 1-15.

* cited by examiner

Primary Examiner — Joseph D Torres
(74) Attorney, Agent, or Firm — Stroock & Stroock & Lavan LLP

(57) ABSTRACT

Incremental redundancy retransmission method suited to the transmissions of packets that can be fragmented into N packets of index i.

7 Claims, 4 Drawing Sheets

US 8,301,957 B2

INCREMENTAL REDUNDANCY RETRANSMISSION METHOD FOR FRAGMENTED PACKETS

CROSS-REFERENCE TO PRIOR APPLICATION

This is a U.S. National Phase Application under 35 U.S.C. §371 of International Application no. PCT/EP2007/064392, filed Dec. 20, 2007, and claims benefit of French Patent Application No. 0611256, filed Dec. 22, 2006, both of which are incorporated herein. The International Application was published in French on Jul. 3, 2008 as WO 2008/077909 under PCT Article 21 (2).

FIELD OF THE INVENTION

The invention relates notably to an incremental retransmission method suited to the transmissions of fragmented packets or even to the transmissions of data that can be fragmented.

It applies, for example, in telecommunication networks, and more specifically, wireless telecommunication networks.

It is used to transmit the SDUs or services provided by a layer of the OSI model to an adjacent layer (SDU standing for Service Data Unit) in a network that uses, for example, the IP protocol.

The fragmentation is defined in the context of the present invention as enabling an adaptation of the packet size between the medium access layer or MAC and the layer above.

PRIOR ART

Given a constant data rate, not all the wireless access methods offer the same performance levels (delay, jitter, packet error ratio, etc) at the outlet of the medium access layer, usually designated by the initials MAC (Medium Access Control), and after the reassembly of the network protocol units or protocol data units (PDUs), corresponding to all the information exchanged between levels in the OSI model layer system, at the level of the IP (Internet Protocol) layer or of any other protocol in which the data packets to be transmitted can be fragmented.

The document entitled "MSDU-Based ARQ Scheme for IP-Level Performance Maximization", by Youngkyu Choi et al, published in the IEEE book Globecom 2005 proceedings, discloses a solution that includes the wireless access layer and the IP layer, in order to optimize the IP level performance. In this document, the idea is to use, at the wireless access layer level, the fact that the MAC packets to be transmitted belong to one and the same IP packet. Based on a conventional wireless access layer ARQ, a system of retransmission based on the detection of errors (ARQ standing for Automatic Repeat Request), the idea is to transfer the persistence of the ARQ for each of the MAC packets (Mac Protocol Data Unit MPDU strategy) into an overall retransmission credit for all the MAC packets that make up the IP packet (MAC service data unit MSDU strategy). The gain in performance at IP level between the two approaches is very significant.

More generally, the prior art provides an enhancement of the IP level performance, by taking into account at the MAC level, the fact that these MAC packets come from one and the same IP packet. This strategy applies to a more general context than that of the Internet protocol, when the MAC packets transmitted come from a fragmentation of a larger packet.

FIG. 1 diagrammatically represents an exemplary implementation of a method according to the prior art. The portion I corresponds to a transmitter, the portion II to the transmission channel and the portion III to the receiver.

The method according to the prior art executes the following steps:

On the transmitter, an SDU packet is fragmented, 1, into a number of packets PDU(i) 2. The method then initializes a counter C_MSDU corresponding to an overall retransmission credit and initializes i=1, 3, then codes the PDU(i) concerned with a CRC, 4. It then decrements the counter C_MSDU by one unit, 5, then the PDU(i) is transmitted, 6, via the transmission channel II, to be received in the receiver portion III. The receiver 7 decodes the CRC, and checks if there is a transmission error, 8. If there is no error, the receiver returns the acknowledgement ACK, correct transmission acknowledgement, 9, to the transmitter, and backs up the PDUs(i) corresponding to the transmitted SDU, 10. It then tests, 11, whether all the PDUs have been transmitted and, if they have, it reassembles them, 12, to obtain the SDU, otherwise it awaits the other packets.

In the case where the receiver detects an error, it returns the acknowledgement NACK, 13, to the receiver.

The acknowledgements ACK or NACK are returned to the transmitter, reception of the acknowledgement 14. The transmitter checks whether the packet is errored, 15. If the packet is valid, it tests, 16, whether all the PDUs have been transmitted and, if they have, the transmitter validates the transmission of the SDU, 17. In the case where all the PDUs have not been transmitted, then the method goes onto the next PDU, 18, with a return to the coding step 4.

In the case where the packet is errored, then the method tests whether the counter C_MSDU is greater than the number N of PDUs that make up the packet minus the number of PDUs already transmitted, 19. In the case where the value of this counter is greater, it corresponds to the fact that there is still credit to transmit the packets, the method repeats the steps from the PDU(i) transmission step, 6.

Otherwise, the credit allowed is used up, in which case the transmitter decrees that transmission of the SDU has failed, 20.

SUMMARY OF THE INVENTION

The idea of the present invention notably includes using a retransmission technique, for example, with incremental redundancy at the MAC layer level, instead of the conventional ARQ (Automatic Repeat Request) technique.

The idea of the invention notably includes implementing the incremental redundancy at the medium access layer level, or MAC level, then implementing, in an associated manner, management of the number of retransmissions which can depend either on the number of fragments transmitted (the fragments being the MAC packets obtained after coding the PDU), or the number of PDUs transmitted.

One or more embodiments of the invention relates to an incremental redundancy retransmission method adapted to transmissions of packets that can be fragmented into N packets of index i characterized in that it includes, in combination, at least the following steps:

1—Receiving an IP packet from the high layers (SDU),
2—Dividing this SDU into N MAC packets (PDU),
3—Initializing the counter C_MSDU corresponding to the overall retransmission credit to N*M, where M is the number of transmissions/retransmissions allowed for each PDU,
4—Initializing i to a given value, i corresponding to the index of the PDU that will be transmitted,
5—Coding a packet PDU(i) with a convolution coder of efficiency 1/K, K MAC packets are obtained, a packet containing the PDU and (K−1) packets containing the redundancy, each of the K MAC packets is denoted P.MAC(i)(k) with k varying from 1 to K, 6—Setting k=1 and transmitting the PDU n°i obtained after coding (i.e. P.MAC(i)(1)), 7—Decrementing the retransmission credit counter, C_MSDU by one unit, 8—If there is no error, transmitting an acknowledgement ACK to the transmitter and checking the value of i, if i=N, then all the PDUs have been transmitted successfully, reassembling the SDU, if i<N and if C_MSDU is greater than the number of PDUs that have not yet been transmitted, incrementing i by one unit and returning to the step 5, if i<N and C_MSDU is less than the number of PDUs that have not yet been transmitted, then decreeing that the transmission of the SDU has failed.

9—If there are errors, sending a NACK to the transmitter and checking the value of C_MSDU:

if C_MSDU is less than the number of PDUs that have not yet been transmitted, then decreeing that the transmission of the SDU has failed, if C_MSDU is greater than the number of PDUs that have not yet been transmitted and the (K−1) redundancy blocks associated with the PDU No. i have not been transmitted, then incrementing k by one unit and transmitting the MAC packet denoted P.MAC(i)(k) and returning to the step 8, if C_MSDU is greater than the number of PDUs that have not yet been transmitted and all the blocks, information and redundancy included, obtained after coding the PDU n°i have been transmitted, then returning to the step 6 without modifying the value of i.

According to an embodiment, the method can include at least the following steps:

generating incremental redundancies from the MAC packet n°i with a mother code of efficiency 1/K in order to obtain K fragments P.MAC(i)(k) ($1 \leq k \leq K$) for the corresponding packet MAC(i).

In the case where there is no error in the transmission of the fragment (ACK received from the receiver to the transmitter), testing whether i=N, If it does, decreeing that the transmission has been successful.

Otherwise, incrementing i and going to the PDU(i) coding step.

In the case where there are errors in the transmission of the fragment (NACK received from the receiver to the transmitter), executing the following steps:

Testing whether the total number of fragments P.MAC(i)(k) transmitted is equal to a given value K?

If it is, reinitializing k to 1, and going to the step of decrementing the transmission credit counter.

Otherwise, incrementing k.

According to an embodiment, the MAC packet with an error correcting code is coded once into an FRG packet which is retransmitted a given number of times.

ADVANTAGES

The method according to one or more embodiments of the invention notably offers the following benefits:

Use of the retransmission with incremental redundancy at the MAC layer level makes it possible to obtain an automatic link, corresponding to a correcting code with variable correction capability, adapting automatically to the state of the transmission channel, It makes it possible to reduce the packet error ratio, the delay and the jitter at the IP level, or at the level of the protocol used.

BRIEF DESCRIPTION OF THE DRAWINGS

Other features and benefits of the present invention will become more apparent from reading the description that follows of an exemplary embodiment given by way of illustration and in a by no means limiting manner, with appended figures which represent.

DESCRIPTION OF THE PREFERRED EMBODIMENT

In order to allow better understanding of the object of the present invention, the description that follows is given by way of illustration and in a nonlimiting manner, in the context of a network operating with the Internet protocol.

Figure 1:
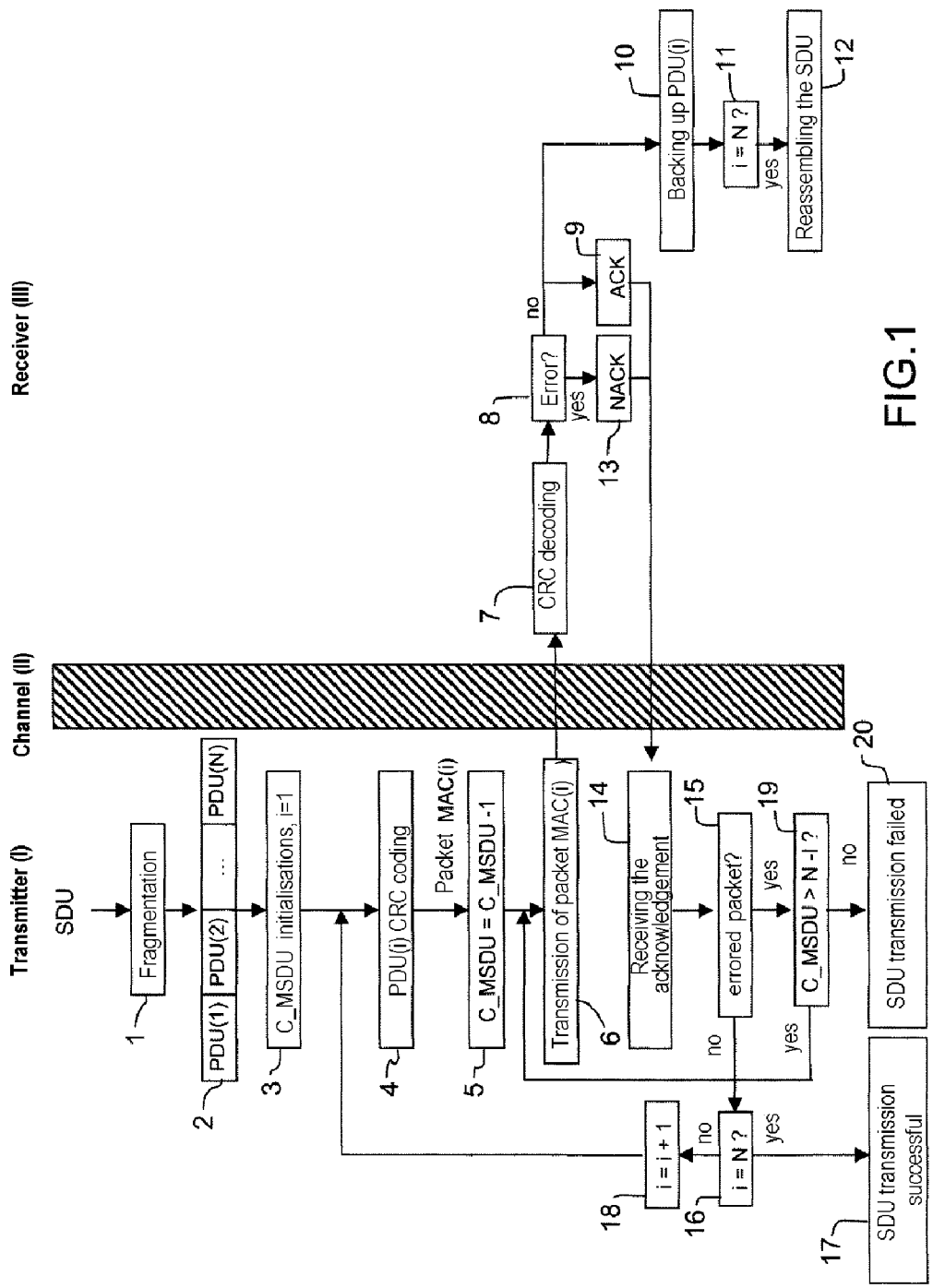
FIG. 1 an exemplary implementation for a method according to the prior art.
Figure 2:
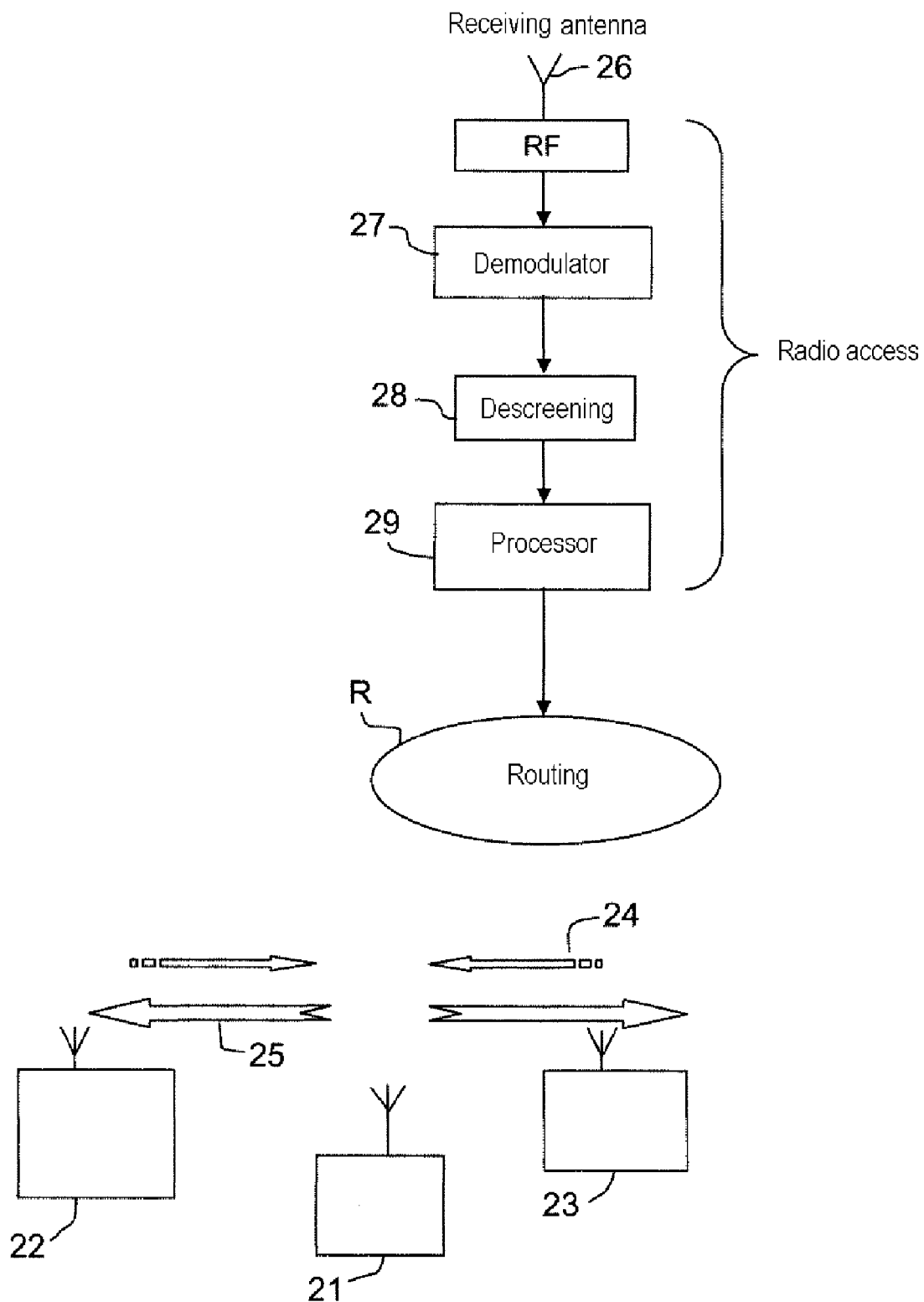
FIG. 2, an exemplary device for implementing the method according to the invention, FIG. 3, an exemplary application in which the method according to the invention can be implemented, FIG. 4, an implementation diagram of the method according to the invention.

FIG. 2 represents an exemplary centralized system diagram for implementing the method according to one or more embodiments of the invention. The diagram includes a base station, acting as the transmitter, 21, a first receiver 22 and a second receiver 23 respectively corresponding to a first user and a second user. The users are subscribers who may or may not be mobile.

The downlink, that is, the direction in which the wanted data is transferred, from the base station to the subscribers, is represented by the arrow 24.

The method according to one or more embodiments of the invention also applies to the case of an uplink, the data being transferred from the subscribers to a central station, the link being represented by the arrow 25. In this application case, the users then act as transmitters and the base station as receiver.

A transmitter and a receiver that are part of the transmission system are equipped with communication means enabling the various forming elements, transmitters and receivers and with a processor-type module enabling the steps of the method described hereinbelow in relation to FIG. 3 to be executed.

On the transmitter, a MAC packet is formatted as a frame, then moves to a modulator before being transmitted to a transmitter including a transmitting antenna. On reception, the signal S received on the receiving antenna 26 passes into a demodulator 27, then a device 28, making it possible to find the initial frame (descreening). The packet is then transmitted to a processor 29 which will execute the steps of the method and generate non-fragmented packets on the routing device R.

Obviously, without departing from the context of the invention, this scheme given as a nonlimiting example can include more than two users.

Figure 3:
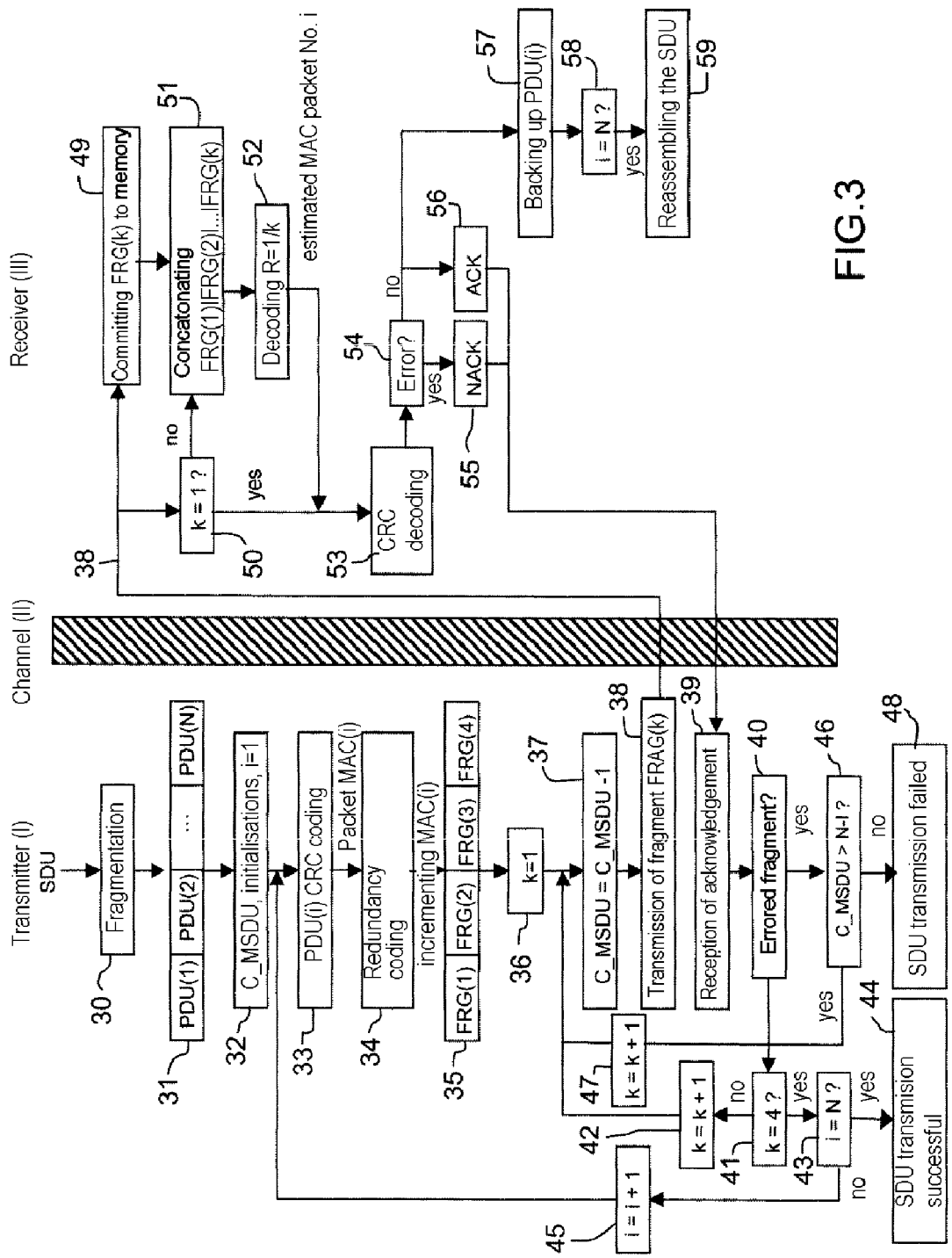

FIG. 3 diagrammatically represents an exemplary implementation of the method according to the invention. It includes a transmitter portion I, a transmission channel portion II and a receiver portion III.

The method according to one or more embodiments of the invention includes, for example, the steps described hereinbelow:

The random generation of an IP packet (SDU) (step 1)
On the Transmitter

The transmitter will, initially, divide the SDU (Service Data unit), 30 into N MAC packets PDU(1), PDU(2) ... PDU(N), 31, step 2. It initializes, step 3, 32, a counter C_MSDU corresponding to an overall retransmission credit to N*M, where M is the number of transmissions/retransmissions allowed for each PDU. It initializes the counter i which corresponds to the index of the packet concerned, for example to a value equal to 1, step 4. In the step 5, referenced 33 in the figure, the transmitter codes the PDU(i) being processed with a convolution coder of efficiency 1/K. At the output of the coder, there are therefore K MAC packets: a MAC packet containing the information, in other words the PDU and the (K−1) packets containing the redundancy. Each of these K MAC packets is denoted P.MAC(i)(k) with P.MAC=Packet MAC, with k varying from 1 to K. For one MAC packet, K MAC packets P.MAC(i)(k) are thus obtained, numbered from 1 to K, 35 (FIG. 3 represents the case where K is equal to 4). The MAC packet P.MAC(i)(1) is identical to the PDU. This corresponds to the compatible efficiency coding principle. The index of the MAC packet P.MAC(i)(k) is initialized, step 36, to k=1, step 6.

During the step 7, referenced 37 in the figure, the transmitter decrements the retransmission credit counter by one unit. It then transmits, 38, the MAC packet P.MAC(i)(1) to the receiver.

The transmitter receives, 39, the acknowledgement of the transmitted packet, coming from the receiver. The transmitter tests, 40, whether the MAC packet P.MAC(i)(1) is errored or not.

Step 8; if there is no error in the transmission, ACK received from the receiver to the transmitter, then the method checks the value of i:
  a. if i=N, then all the PDUs have been transmitted successfully, reassemble the SDU,
  b. if i<N and if C_MSDU is greater than the number of PDUs that have not yet been transmitted, increment i by one unit and return to the step 5,
  c. if i<N and C_MSDU is less than the number of PDUs that have not yet been transmitted, then decree that the transmission of the SDU has failed.

Step 9: if there are errors, send a NACK to the transmitter and check the value of C_MSDU :
  if C_MSDU is less than the number of PDUs that have not yet been transmitted, then decree that the transmission of the SDU has failed,
  if C_MSDU is greater than the number of PDUs that have not yet been transmitted and the (K−1) redundancy blocks associated with the PDU n°i have not all been transmitted, then increment k by one unit and transmit the MAC packet denoted P.MAC(i)(k) and return to the step 8.
  If C_MSDU is greater than the number of PDUs that have not yet been transmitted and all the blocks, information and redundancy included, obtained after coding of the PDU No. i have been transmitted, then return to the step 6 without modifying the value of i.

On the transmitter, the method excecutes the following steps:
  If there are errors, test, 41, whether the total number of PDUs has been transmitted, I=N?
  If it has, 44, the transmitter decrees that the transmission of the SDU has been successful.
  Otherwise, 45, consider the next MAC packet, i=i+1,
  If there are errors in the transmission, NACK received,
  If the number of PDUs remaining to be transmitted is less than the value of the counter C_MSDU, 46, test the value of k:
    If k=K, decrement the counter C_MSDU, 37, set k=1 and transmit the fragment P.MAC(i)(1), 47, 38
    If k<K, increment k by one unit and transmit the fragment P.MAC(i)(k), 47, 38
  If it is not, stop the transmission of the SDU, SDU transmission failed, 48.

On the Receiver

The receiver receives a transmitted fragment, 38, and commits it to memory 49, and simultaneously tests whether k=1, 50.
  If k is different from 1, it carries out the concatenation 51 of the MAC packets P.MAC(i)(k) received from 1 to k, by using the stored elements, it decodes with the coding of efficiency R=1/k and it goes to the decoding step 52,
  If k is equal to 1, then the receiver decodes the CRC of the received MAC packet, 53,
After decoding, the receiver tests whether there is an error in the transmission of the fragment, 54,
  If there is an error, it transmits the NACK message, 55, to the transmitter,
  If there is no error, it transmits the ACK message, 56, to the transmitter and simultaneously performs a backup of the PDU(i), 57, then tests whether i is equal to the number N of PDUs, 58,
    If it is, it reassembles the SDU, 59,
    If it is not, it awaits the other packets.

Figure 4:
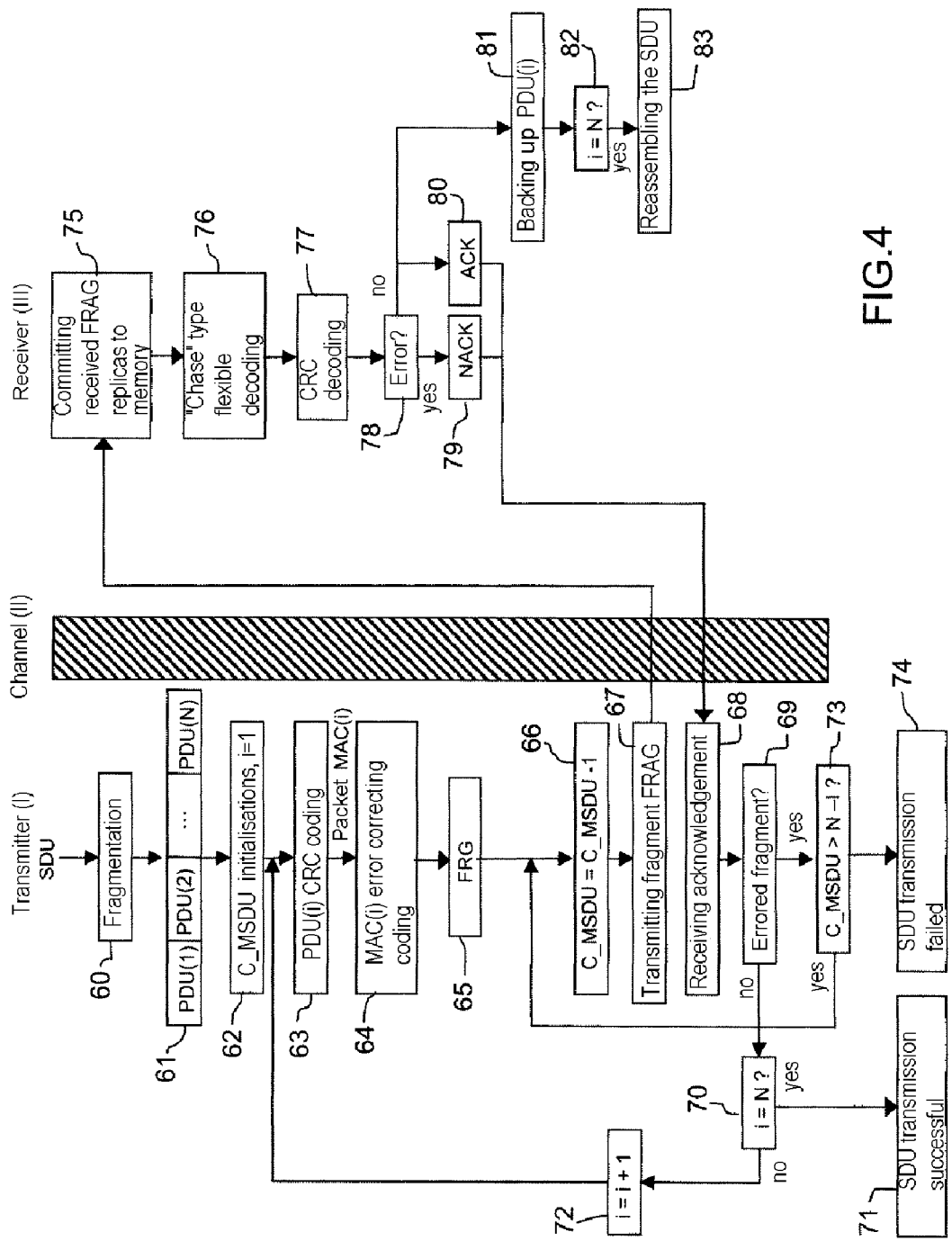

FIG. 4 represents a variant embodiment for which the MAC packet with an error correcting code is coded once into an FRG (fragment) packet that is retransmitted as many times as are needed. The number is set, for example, according to the counter corresponding to an overall retransmission credit. On reception, the method collects the retransmitted versions of fragment FRG that it decodes by a flexible decoding method of the "chase decoding" type that is known to those skilled in the art.

The method, for example, executes the following steps:
On the Transmitter

The transmitter will, initially, fragment the SDU (Service Data unit), 60, into N packets PDU(1), PDU(2) ... PDU(N), 61. It initializes, 62, a counter corresponding to an overall retransmission credit C_MSDU and the counter i of the packet number to be processed to 1. In the step 63, the transmitter codes the PDU(i) currently being processed with a CRC, leading to a packet MAC(i) then, 64, it codes the MAC packet with an error correcting code known to those skilled in the art into an FRG packet, 65, which is retransmitted as many times as are necessary. During the step 66, the transmitter decrements the retransmission credit counter by one unit.

It then transmits, 67, the fragment FRG to the receiver.

The transmitter receives, 68, the acknowledgement of the transmitted packet, coming from the receiver. The transmitter tests, 69, whether the fragment is errored or not.

If there is no error in the transmission (ACK received from the receiver to the transmitter), then
  test whether the total number of packets i=N? has been transmitted, 70,
  If yes, 71, the transmitter decrees that the transmission of the SDU has been successful,
  Otherwise, 72, consider the next MAC packet, i=i+1, and return to the CRC coding step, 63,
If there are errors in the transmission, NACK received, If the number of fragments remaining to be transmitted is less than the value of the counter C_MSDU, 73, the counter C_MSDU, is decremented, 66, and the transmission of the fragment FRG is repeated within the limits of the counter C_MSDU, Otherwise stop transmission of the SDU, SDU transmission failed, 74.

On the Receiver

The receiver receives a transmitted fragment, and commits it to memory, 75,

It decodes the fragment FRG by using a flexible decoding, 76, then decodes the CRC, 77.

It then tests, 78, whether there is an error,

In the case of an error, 79, it transmits the NACK message to the transmitter (69).

Otherwise, 80, it transmits the ACK message to the transmitter, and simultaneously backs up the PDUs(i), 81, checks whether i is equal to the number N of PDUs, 82

If it is, it reassembles the SDU, 83

If it is not, it awaits the other packets.

The steps of the method described hereinabove can be implemented in any point-to-point, point-to-multipoint network or any other multimedia wireless access system.

The fragments K can have the same size, or different sizes.

The invention claimed is:

1. An incremental redundancy retransmission method adapted to transmission of packets that can be fragmented into N packets, comprising the steps of:
    receiving an SDU, wherein the SDU is an IP packet from a high-layer protocol;
    dividing the SDU into a plurality of N MAC protocol data units PDU(i), wherein i varies from one to N;
    Initializing a retransmission credit counter, corresponding to an overall retransmission credit, to a value N*M, wherein M is a number of transmissions allowed for each protocol data unit;
    Initializing i to a predetermined value, i corresponding to an index of PDU(i) that will be transmitted;
    coding PDU(i) with a convolution coder of efficiency 1/K, to produce K MAC packets, wherein each of the K MAC packets comprise PDU(i), respectively, and (K−1) packets containing a redundancy, wherein each of the K MAC packets is denoted P.MAC(i)(k) with k varying from one to K;
    setting k equal to one, and transmitting P.MAC(i)(1);
    decrementing the retransmission credit counter by one count; and
    checking if there is no transmission error, wherein:
        if there is no transmission error:
            transmitting an acknowledgement to a transmitter;
            checking a value of i, wherein:
                if i is equal to N, then all protocol data units have been transmitted successfully, reassembling the SDU;
                if i is less than N and if the retransmission credit is greater than a number of protocol data units that have not yet been transmitted, incrementing i by one count and returning to the step of coding PDU(i); and
                if i is less than N and the retransmission credit is less than the number of protocol data units that have not yet been transmitted, then indicating that a transmission of the SDU has failed;
        if there are one or more transmission errors:
            sending a NACK to the transmitter; and
            checking the value of the retransmission credit, wherein:
                if the retransmission credit is less than the number of protocol data units that have not yet been transmitted, then indicating that the transmission of the SDU has failed;
                if the retransmission credit is greater than the number of protocol data units that have not yet been transmitted and the (K−1) redundancy blocks associated with PDU(i) have not been transmitted, then incrementing k by one count and transmitting P.MAC(i)(k) and returning to the step of checking if there is no transmission error; and
                if the retransmission credit is greater than the number of protocol data units that have not yet been transmitted and including all blocks, information and redundancy obtained after coding the PDU(i) would have been transmitted, then returning to the step of setting k equal to one without modifying the value of i.

2. The method as claimed in claim 1, wherein:
    generating incremental redundancies from PDU(i) with a coding efficiency of 1/K in order to obtain K fragments for the corresponding PDU(i); and
    checking if there is no transmission error of P.MAC(i)(k), wherein:
        if there is no transmission error performing the steps of:
            if i equals N, then indicating that the transmission has been successful; and
            if i equals N, then incrementing i and go to the step of coding PDU(i);
        if there is a transmission error, performing the steps of:
            testing whether a total number of fragments P.MAC (i)(k) transmitted is equal to a predetermined value K, wherein:
                If the testing passes, reinitializing k to 1, and going to the step of decrementing the retransmission credit counter; and
                if the testing fails, incrementing k.

3. The method as claimed in claim 1, wherein the step of receiving further comprising the steps of:
    storing a received fragment; and
    testing, (50) substantially simultaneously with the step of storing, whether an index k of the received fragment corresponds to a first fragment of the transmitted packet, wherein:
    if k is different from one:
        concatenating the received fragments from 1 to k, by use of the stored elements; and
        decoding with the coding efficiency used in transmission and going to a decoding step; and
    if k is equal to one:
        decoding a CRC of the P.MAC(i)(k) received; and
        after the step of decoding, testing whether there is an error in a transmission of the fragment, wherein:
            if there is an error in the transmission of the fragment, transmitting a NACK message, to the transmitter; and
            if there is no error in the transmission of the fragment, performing the steps of:
                transmitting an ACK message, to the transmitter;
                substantially simultaneously forming a backup of the protocol data unit; and testing whether i is equal to the number N of protocol data units, wherein if affirmative, then performing the step of reassembling the SDU.

4. The method as claimed in claim 1, wherein the MAC packet with an error correcting code is coded once into a packet which is retransmitted a predetermined number of times.

5. The method as claimed in claim 4, wherein the step of receiving further comprises the steps of:
    storing the received FRG replicas in memory;
    flexibly decoding an FRG replica;
    decoding a CRC of the received FRG replica; and
    testing for an error, wherein:
        in case of an error, transmitting a NACK acknowledgement to the transmitter;
        in case of no error:
            transmitting an ACK acknowledgement to the transmitter;
            in parallel with the step of transmitting, backing up the protocol data units; and
            testing whether i is equal to the number N of protocol data units, wherein:
                if affirmative, reassembling the SDU; and
                if negative, await other packets.

6. The method as claimed in claim 1, further comprising the step of decrementing the retransmission credit counter by one count.

7. The method as claimed in claim 1, wherein the transmission of packets is by IP protocol.

* * * * *